(No Model.)

D. L. EMRY.

DEVICE FOR SECURING THE SPLICE JOINTS OF RAILROAD RAILS.

No. 293,644. Patented Feb. 19, 1884.

Witnesses.
G. A. Haseltine.
L. A. Haseltine.

Inventor.
David L. Emry
By Seward A. Haseltine
Attorney.

UNITED STATES PATENT OFFICE.

DAVID L. EMRY, OF CARTHAGE, MISSOURI.

DEVICE FOR SECURING THE SPLICE-JOINTS OF RAILROAD-RAILS.

SPECIFICATION forming part of Letters Patent No. 293,644, dated February 19, 1884.

Application filed November 26, 1883. (No model.)

*To all whom it may concern:*

Be it known that I, DAVID L. EMRY, a citizen of the United States, residing at Carthage, in the county of Jasper and State of Missouri, have invented certain new and useful Improvements in Devices for Securing the Splice-Joints of Railroad-Rails, of which the following is a specification, reference being had therein to the accompanying drawings.

My invention relates to improvements in a device for securing the splice-joints of railroad-rails, the object of which is to provide for firmly holding and preventing the turning off of the screw-nuts on the bolts which extend through the rail and fish-plates at the joints of railroad-rails, and thus save a large amount of time now spent in tightening the same. These objects I attain by means of the device illustrated in the accompanying drawings, forming a part of this specification, in which—

Figure 1:
Figure 2:
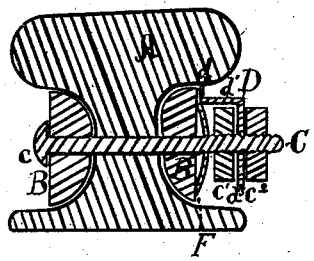
Figure 3:
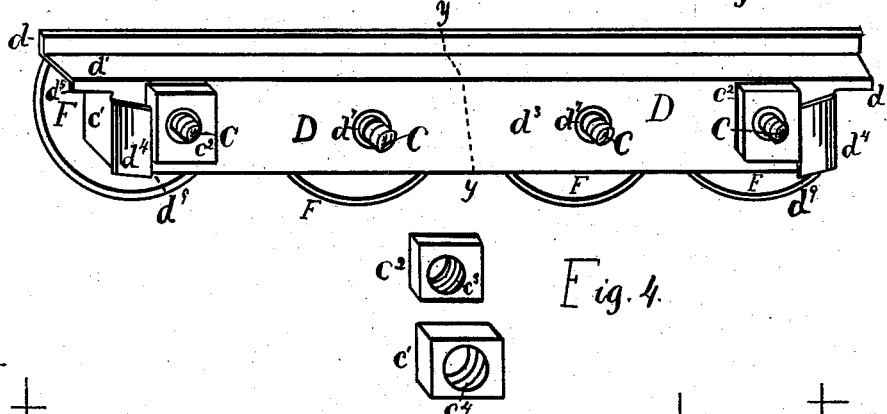
Figure 4:
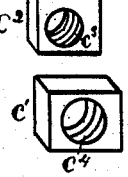

Figure 1 is a view showing the entire device as applied to the rail. Fig. 2 is a sectional view on the line $x\ x$ of Fig. 1. Fig. 3 is a view of my device apart from the rail. Fig. 4 is a view of the threads in the upper and under screw-nuts.

The distinctive features of my invention consist in a plate placed between two nuts on the bolts holding the fish-plates to the railroad-rails, said plate bent so as to rest against the upper surfaces or edges of the screw-nuts of said bolts, to prevent them from turning off, this part being made with a piece extending upward and against the fish-plates, to strengthen the same, said plate also having the ends turned outward and backward upon themselves, to prevent the upper or outer screw-nuts from turning off; and, in combination with the above, concave washers placed next to the fish-plate and convex on the side next to the screw-nut, a different-sized thread in the upper from the under screw-nut, all as hereinafter more fully set forth.

A is a railroad-rail.

B B are fish-plates.

C is a connecting-bolt; $c$, the head; $c'\ c^2$, the screw-nuts.

F is a washer for the bolt, made concave on the side next to the fish-plate and convex on the other side next to the nut $c'$. This washer serves to keep a constant pressure on the under side of the nut $c'$, thus assisting to hold it firm, and also to keep it firm when the bolts are worked by the cars passing over. These washers are preferably made of spring-steel.

D is a plate, made of steel or other material, preferably made of thin iron bent to form the parts $d\ d'\ d^3\ d^4$. The part $d'$ is to rest against the upper sides or edges of the nuts $c'$, to prevent their turning off, and to strengthen the plate the part $d$ is bent up against the fish-plate, while the part $d^3$ is provided with holes $d^7$, to fit closely over and around the bolts C, and is tightly fastened between the two screw-nuts $c'\ c^2$.

$d^4$ is a part of $d^3$, cut at $d^5$, and bent outward and backward upon itself, to form a strong support, by the end $d^9$ against the side of the nut $c^2$, to prevent its turning off.

The plate D may be made in two or more pieces, divided on the line $y\ y$; but, as described, I prefer to make it in one entire piece.

The upper or outer nuts, $c^2$, are made with threads $c^3$, preferably smaller than those $c^4$ in nut $c'$, so that when screwed down they hold very tightly.

The device is put together thus: The bolt C is placed through the railroad-rail and fish-plates. Then the spring-washer F is put on and the screw-nuts $c'$ screwed down, leaving the upper edge or side parallel with the surface of the track. The plate D is then placed on the bolts, letting the part $d'$ rest against the upper sides of the nuts $c'$. The nuts $c^2$ being then screwed down, the ends $d^4$ are bent outward and backward, to form a support for them.

Having thus described the construction and operation of my invention, what I claim as new, and desire to secure by Letters Patent, is—

1. A device for securing the splice-joints of railroad-rails, composed of a spring-washer, F, upon a bolt, C, said bolt having screw-nuts $c'\ c^2$, with different-sized threads, and a plate, D, having the parts $d\ d'\ d^3$ and ends $d^4$ turned back upon itself, all substantially as shown and described.

2. In a device for securing the screw-nuts on bolts extending through the splice-joints of railroad-rails, a plate, D, with parts $d\ d'\ d^3$, and a part, $d^4$, turned outward and backward upon itself, substantially as shown and described, for the purposes set forth.

3. The combination of a plate, D, having the parts $d\ d'\ d^3$ and a piece, $d^4$, with screw-nuts $c'\ c^2$, having different-sized threads, upon a bolt, C, holding the fish-plates of railway-rails, substantially as and for the purpose set forth.

4. The combination of a plate, D, having the parts $d\ d'\ d^3$ and piece $d^4$, with concave and convex spring-washers F upon the bolts and under the nuts, holding the splice-joints of railway-rails, substantially as and for the purpose set forth.

In testimony whereof I affix my signature in presence of two witnesses.

DAVID L. EMRY.

Witnesses:
A. E. GREGORY,
ALBERT F. FRYE.